United States Patent Office 3,135,736
Patented June 2, 1964

3,135,736
ARYLHYDRAZONES OF CARBONYL CYANIDE BEARING PENTAFLUOROSULFIDE SUBSTITUENTS
William W. Prichard, Hockessin, Del., assignor to E. I. du Pont de Nemours and Company, Wilmington, Del., a corporation of Delaware
No Drawing. Filed Oct. 28, 1960, Ser. No. 65,583
5 Claims. (Cl. 260—193)

This invention relates to new substituted aromatic hydrazones of carbonyl cyanide (or aromatic azomalononitriles) and to their preparation. More particularly this invention relates to selected substituted aromatic hydrazones of carbonyl cyanide having pentafluorosulfur substituents which are biologically active and to biologically active compositions containing said hydrazones and to their use.

There is great interest in compounds that regulate the growth of plants. Thus, malononitrile and certain of its derivatives have been proposed in U.S. 2,683,659 as plant growth inhibiting compositions. Recently, certain arylazomalononitriles have been found effective as inhibitors of plant and fungal growth.

It is an object of this invention to provide new substituted aromatic hydrazones of carbonyl cyanide (or aromatic azomalononitriles) and to provide a process for their preparation. A further object is to provide selected substituted aromatic hydrazones of carbonyl cyanide which are biologically active. A still further object is to provide novel biologically active compositions containing said substituted aromatic hydrazones of carbonyl cyanide as the active ingredient and process for their use. Other objects will appear hereinafter.

These and other objects of this invention are accomplished by the following new class of compounds namely, the pentafluorosulfidoaromatic hydrazones of carbonyl cyanide (or pentafluorosulfidoaromatic azomalononitriles). It now has been found that the pentafluorosulfidoaromatic hydrazones of carbonyl cyanide are effective biologically active compounds and are particularly effective biological growth inhibitors.

Since these new compounds exist in the tautomeric form they are represented by the formulas (A)

$$(F_5S)_nAr-N=N-CH(CN)_2$$

pentafluorosulfides of aromatic azomalononitriles or (B)

$$(F_5S)_nAr-NH-N=C(CN)_2$$

pentafluorosulfides of aromatic hydrazones of carbonyl cyanide. In both formulas Ar represents an aromatic hydrocarbon radical of 6–18 carbons and preferably 6–12 carbons and $n$ is an integer of at least one and preferably not over three. Infrared spectra indicate that tautomeric form (B), the pentafluorosulfides of aromatic hydrazones of carbonyl cyanide, is the principal form of this class of compounds. For this reason the compounds are generally referred to by the name based on the latter structure although a mixture of both types is obtained by methods of synthesis. For purposes of simplicity, the pentafluorosulfido ($SF_5$) radical or radicals on the aromatic group are hereinafter named as a substituent, i.e. as the pentafluorosulfido radical on an aromatic group.

The compounds of this invention include those as represented in the above formulas. The aromatic hydrocarbon group has at least six carbons and may have additional inert substituent groups (i.e., nuclear groups non-reactive with amino groups or reagents employed for the preparation of the new products of this invention), e.g., as in phenyl, diphenyl, terphenyl, tolyl, naphthyl, chlorophenyl, dichlorophenyl, fluorophenyl, bromophenyl, etc., wherein the additional inert groups include hydrocarbon and halogen (particularly of atomic number of not over 35).

The new substituted aromatic hydrazones of carbonyl cyanide of this invention are solids. They are crystalline and exhibit solubility in organic solvents. They are generally yellow to orange in color. Although they are not soluble in water, particularly if the pH is on the acid side, they are generally soluble in aqueous solutions containing a small amount of a basic material, e.g., sodium bicarbonate or sodium carbonate.

The new compounds of this invention are obtained by reaction of malononitrile with a diazonium salt of a pentafluorosulfido substituted aromatic amine, i.e., $$(F_5S)_nArN_2^+$$

The general technique of this reaction and methods for the preparation of intermediates are more completely described by reference to examples.

It has now been found that aromatic hydrazones of carbonyl cyanide having pentafluorosulfide substituents on the aromatic ring are particularly effective biological growth regulators. Compositions containing the pentafluorosulfidoaromatic hydrazones of carbonyl cyanide in a carrier, e.g., an inert medium, such as in aqueous or organic liquids or solvents, are biologically active and have valuable plant growth regulating and other biologically active properties as hereinafter disclosed.

The following examples, in which the parts are by weight, further illustrate the preparation and properties of the new compositions of this invention.

EXAMPLE I

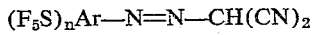

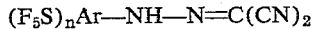

A. *Preparation of p-Nitrophenylsulfur Pentafluoride*

A copper reaction vessel (capacity, 1000 parts of water) equipped with a condenser made of poly(tetrafluoroethylene) and a stainless steel stirrer, was charged with 46.2 parts of bis(p-nitrophenyl)disulfide, 260 parts of silver difluoride and about 312 parts of trichlorotrifluoroethane. The reaction mixture was heated with stirring to reflux temperature for one hour. The trichlorotrifluoroethane was removed by distillation and the residue heated for two hours at 120–130° C. After cooling about 15 hours, the reaction mixture was extracted with three portions of carbon tetrachloride of about 225 parts each and two portions of chloroform of about 100 parts each. The solvent extracts were combined and the solvents removed by distillation. There remained a residue of yellow oil and orange solid which was subjected to evaporative distillation at about 80° C. and 1–2 mm. pressure to yield 8.6 parts of p-nitrophenylsulfur pentafluoride $$(NO_2C_6H_4SF_5)$$

The compound, a pale yellow liquid, was further purified by distillation through an efficient fractionating column. It boiled at 89.3° C./3.8 mm. and had a refractive index $(n_D^{25})$ of 1.4729. On standing, the pure liquid crystallized into large prisms which were recrystallized from pentane, M.P. 37.5–38.5° C. The structure of the compound was confirmed by nuclear magnetic resonance, infrared and ultraviolet spectra and by elementary analysis.

*Analysis.*—Calcd. for $C_6H_4NO_2SF_5$: C, 28.9; H, 1.66; N, 5.63; S, 12.87; F, 38.1. Found: C, 29.1; H, 1.85; N, 5.21; S, 12.94; F, 3.87.

B. *Preparation of p-Aminophenylsulfur Pentafluoride*

A Parr hydrogenation pressure vessel (capacity, 500 parts of water) was charged with 8.3 parts of p-nitrophenylsulfur pentafluoride, 78 parts of absolute ethanol, approximately 5 parts of a 5.5 N solution of hydrogen chloride in ethanol, and 0.3 part of a commercially available platinum oxide catalyst. The charged reaction vessel was flushed with hydrogen, then pressured to 40 pounds with hydrogen, and shaken for approximately 30 minutes. The reaction vessel was then charged with 0.2 part of fresh platinum oxide and again shaken under hydrogen at 40 pounds pressure for 60 minutes. The reaction mixture was filtered and the ethanol removed by evaporation at room temperature under an atmosphere of nitrogen. The solid product which remained was triturated with about 75 parts of ethyl ether, the ether removed by filtration and the solid washed thoroughly with ether. There was obtained 8.5 parts of the hydrochloride of p-aminophenylsulfur pentafluoride as a fine white powder. The identity of the compound was confirmed by the infrared spectrum and by elementary analysis.

Analysis.—Calcd. for $C_6H_7NSF_5Cl$: C, 28.2; H, 2.76; N, 5.48; S, 12.6; F, 37.2; Cl, 13.9; M.W., 255.6. Found: C, 28.5; H, 3.00; N, 5.53; S, 12.5; F, 37.2; Cl, 12.5; M.W., 255.0.

C. p-Pentafluorosulfidophenylhydrazone of Carbonyl Cyanide

A solution of 12.8 parts of the hydrochloride of p-aminophenyl pentafluorosulfide was prepared in 150 parts of water and 8 parts of 37% hydrochloric acid. Ice was added to the solution to reduce the temperature to −5° C., and 3.5 parts of sodium nitrite, dissolved in water, was added slowly. A small amount of orange precipitate formed during the diazotization and was removed by filtration. A solution of 3.3 parts of malononitrile in 50 parts of water was added and the solution made alkaline. A deep yellow solution resulted. Acidification of this solution caused the precipitation of a yellow solid in 97% yield. This was the p-pentafluorosulfidophenylhydrazone of carbonyl cyanide which melted, with decomposition, at 174–176° C.

A 5-p.p.m. solution of this compound, applied to the roots of ten-day old squash seedlings, caused considerable retardation of growth of the plants.

Five days after treatment, the seedlings were exposed to a temperature of 25° F. for three hours. Only four out of twenty-eight plants were killed by this treatment while eighteen of comparable untreated control plants were killed. Nineteen of the treated plants were essentially undamaged by the freezing treatment, while all of the surviving control plants were seriously damaged.

EXAMPLE II

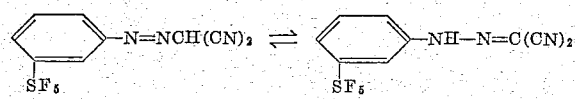

The procedure of Example I-A and I-B was repeated employing the meta nitro-substituted compound in place of the para nitro-substituted compound of parts A and B. There was obtained in good yield the hydrochloride of m-aminophenylsulfur pentafluoride as a fine white powder whose identity was confirmed by infrared, nuclear magnetic resonance and ultraviolet spectra and by elementary analysis.

Analysis.—Calcd. for $C_6H_7NSF_5Cl$: C, 28.2; H, 2.76; N, 5.48; S, 12.6; F, 37.2; Cl, 13.9; M.W. 255.6. Found: C, 28.5; H, 3.16; N, 5.45; S, 12.9; F, 37.4; Cl, 14.3; M.W., 257.0.

The m-pentafluorosulfidophenylhydrazone of carbonyl cyanide was prepared exactly as in Example I (part C), using as the starting material the hydrochloride of m-aminophenyl pentafluorosulfide. The yield of yellow crystals, which decomposed at 170–172° C., was nearly quantitative.

EXAMPLE III

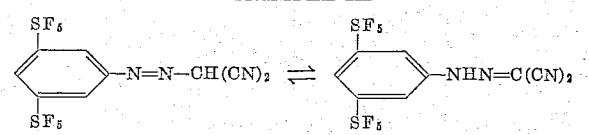

A. Preparation of Nitrophenyl Polysulfide

A reaction vessel fitted with a stirrer was charged with about 260 parts of 55% aqueous hydrogen iodide to which 57.3 parts of 5-nitro-1,3-phenylenebis(sulfonyl chloride) was added rapidly dropwise with vigorous stirring. After addition was complete, aqueous sodium bisulfite solution was added with stirring until no free iodine remained. The solid product was separated from the aqueous reaction mixture by filtration and the product washed thoroughly with water and acetone. There was obtained 31 parts (93% yield) of a yellow powder which is a polysulfide of the following structure:

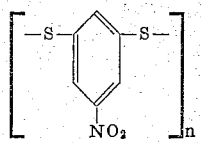

The value of $n$ is probably 3 or more.

Analysis.—Calcd. for $(C_6H_3NO_2S_2)$: C, 38.4; H, 1.60; N, 7.50; S, 34.5. Found: C, 38.9; H, 1.63; N, 7.56; S, 34.6.

B. Preparation of the Nitroarylsulfur Pentafluoride

A mixture of 60 parts of the polydisulfide obtained in part A, 550 parts of silver difluoride, and about 280 parts of trichlorotrifluoroethane was treated as described in Example I-A. There was obtained 14.0 parts of 5-nitro-1,3-phenylenebis(sulphur pentafluoride), B.P. 92–93.5° C. at 2.4 mm., M.P. 71–72° C. The identity of the compound, which has the structure:

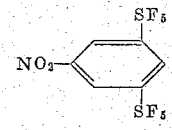

was confirmed by nuclear magnetic resonance, infrared and ultraviolet absorption spectra and by elementary analysis.

Analysis.—Calcd. for $C_6H_3NO_2S_2F_{10}$: C, 19.2; H, 0.81; N, 3.74; S, 17.1; F, 50.6. Found: C, 19.2; H, 0.93; N, 3.70; S, 16.7; F, 50.5.

C Preparation of the Aminoarylsulfur Pentafluoride

A Parr hydrogenation unit as described in Example I, part B, was charged with 9.7 parts of 5-nitro-1,3-phenylenebis(sulfur pentafluoride), 78–80 parts of absolute ethanol, about 4.5 parts of a 5 N solution of hydrogen chloride in absolute ethanol, and 0.3 part of a commercial platinum oxide catalyst. The hydrogenation was conducted at 40 pounds hydrogen pressure. An additional 0.15 part of platinum oxide catalyst was supplied to the reaction mixture during the process to insure complete hydrogenation. The reaction product was purified as described in Example I and there was obtained 7.5 parts of the hydrochloride of 5-amino-1,3-phenylenebis(sulfur pentafluoride), a cream-colored, fluffy, crystalline solid. The identity of the compound was confirmed by infrared and ultraviolet spectra and by elementary analysis.

Analysis.—Calcd. for $C_6H_5NS_2F_{10} \cdot HCl$: C, 18.9; H, 1.59; N, 3.67; F, 49.8. Found: C, 19.3; H, 1.60; N, 3:22; F, 50.45.

The free amino compound was obtained by adding 4.33 parts of the preceding hydrochloride slowly and with stirring to about 100 parts of a 10% aqueous solution of sodium crabonate. The compound was extracted from the aqueous solution with ether and purified as described in Example I. There was obtained 2.8 parts of 5-amino- 1,3-phenylenebis(sulfur pentafluoride) a crystalline white solid, M.P. 80.7–81.5° C. The identity of the compound was confirmed by infrared, ultraviolet, and nuclear magnetic resonance spectra and by elementary analysis.

*Analysis.*—Calcd. for $C_6H_5NS_2F_{10}$: C, 20.9; H, 1.46; N, 4.06; F, 55.03. Found: C, 21.2; H, 1.48; N, 4.04; F, 55.35.

D. *Bis(3,5-Pentafluorosulfido)Phenylhydrazone of Carbonyl Cyanide*

A solution of 2.1 parts of bis(3,5-pentafluorosulfido)-aniline in ethanol was treated with one equivalent of hydrogen chloride in ethanol and then with 0.72 part of isoamyl nitrite. A white precipitate formed immediately. The solution was diluted with water to partly redissolve this solid, and 0.5 part of malononitrile in ethanol added. The solution was made alkaline with sodium hydroxide, filtered, and the filtrate acidified. The yellow precipitate was removed by filtration and recrystallized from chloroform. The yield was 0.88 part of orange crystals melting at about 200° C. with decomposition. The infrared spectrum, run in a mineral oil mull, is consistent with the structure of the bis(3,5-pentafluorosulfido)phenylhydrazone of carbonyl cyanide.

In a similar manner, reaction of malononitrile with the diazonium salt of pentafluorosulfidobiphenyl gives the corresponding pentafluorosulfidobiphenylhydrazone of carbonyl cyanide. The intermediates for the latter were prepared as follows:

A. *Preparation of 2'- and 4'-Nitrobiphenyl-3-Sulfur Pentafluoride*

A solution of 25.4 parts of the hydrochloride of p-aminophenylsulfur pentafluoride was prepared in 10 parts of water, 10 parts of ice, and about 12 parts of concentrated hydrochloric acid. A solution of 7.6 parts of sodium nitrite in 10 parts of water was added gradually to the amine hydrochloride solution at −5° C. to form a solution of the diazonium salt. This solution was added rapidly and with vigorous stirring to about 240 parts of nitrobenzene cooled to 5–6° C. A solution of 30 parts of sodium acetate trihydrate in 80 parts of water was then added dropwise to the above nitrobenzene mixture at a temperature of approximately 5° C. and the mixture stirred three hours at 5–10° C. The nitrobenzene layer which contained the reaction product was separated and the nitrobenzene removed by distillation. The residue was partially purified in a molecular still, the product being a mixture of liquid and solid materials. The mixture was further purified by elution chromatography, employing a column (1″ by 24″) of basic alumina (170 parts) and a 50% solution of benzene in n-hexane. By repeated crystallizations of purified material there was obtained 0.69 part of 4'-nitrobiphenyl-3-sulfur pentafluoride as pale yellow crystals, M.P. 128.6–129.0° C. and 2.05 parts of 2'-nitrobiphenyl-3-sulfur pentafluoride, also as pale yellow crystals, melting at 81.0–81.7° C.

The identity of each compound was confirmed by infrared, ultraviolet, and nuclear magnetic resonance spectra and by elementary analysis.

*Analysis.*—Calcd. for $C_{12}H_8NO_2SF_5$: C, 44.3; H, 2.48; F, 29.2; N, 4.31. Found for the 4'-nitro compound: C, 44.7; H, 2.58; F, 29.3; N, 3.83. Found for the 2'-nitro compound: C, 44.9; H, 2.60; F, 28.9; N, 3.92.

B. *Preparation of Aminobiphenylsulfur Pentafluoride*

A Parr hydrogenation unit was employed as described in Example I, part B. A mixture of 2.0 parts of 2'-nitro-3-biphenylsulfur pentafluoride, 70–75 parts of absolute ethanol, approximately 1.0 part of a 5 N solution of hydrogen chloride in ethanol, and 0.2 part of platinum oxide catalyst was hydrogenated under 40 pounds hydrogen pressure. During the reaction 0.1 part of platinum oxide catalyst was added to insure complete hydrogenation of the nitro compound. The product was purified as described in Example I and there was obtained 1.43 parts of the hydrochloride of 2'-amino-3-biphenylsulfur pentafluoride, a white solid in the form of powdery crystals. The identity of the compound was confirmed by the infrared and ultraviolet spectra and by elementary analysis.

*Analysis.*—Calcd. for $C_{12}H_{10}NSF_5 \cdot HCl$: C, 43.44; H, 3.35. Found: C, 43.40; H, 3.98.

The compound, 4'-amino-3-biphenylsulfur pentafluoride, was obtained by hydrogenation of 4'-nitro-3-biphenylsulfur pentafluoride, using the procedure described for obtaining the 2'-amino compound. Reaction of malononitrile with diazonium salt of these biphenylsulfur pentafluoride gives 3'-pentafluorosulfido-2-biphenylhydrazone of carbonyl cyanide and 3'-pentafluorosulfido-4-biphenylhydrazone of carbonyl cyanide.

In like manner, 5-amino-1-naphthylsulfur pentafluoride is obtained from 5-nitro-1-naphthylsulfur pentafluoride and 4-amino-2-naphthylsulfur pentafluoride is obtained from 4-nitro-2-naphthylsulfur pentafluoride. The latter amino compounds, upon conversion to their diazonium salts and reaction with malononitrile, produce the 5-pentafluorosulfido-1-naphthylhydrazone of carbonyl cyanide and the 3-pentafluorosulfido-1-naphthylhydrazone of carbonyl cyanide. In a similar manner 5-amino-2,5',5″-tris(p-terphenyl)sulfur pentafluoride is converted to 6,3',3″-tris(pentafluorosulfido)-p-terphenyl-3-hydrazone of carbonyl cyanide.

The aminoarylsulfur pentafluoride intermediates can be obtained by several procedures. A method of general application consists in reducing the nitro group in nitroarylsulfur pentafluorides by conventional and well-known methods, e.g., by a catalytic hydrogenation process employing a platinum oxide catalyst.

The nitroarylsulfur pentafluorides from which the amino compounds are prepared are obtained by reacting a nitroaryl disulfide or a nitroarylsulfur trifluoride with silver difluoride at a temperature of at least 115° C. There can be present in the nitroaryl compounds more than one disulfide (—S—S—) group or sulfur trifluoride group. Preferably, there are at most three of each of these groups on the aromatic compound. In the operation of the process employing a nitroaryl disulfide, the reaction mixture may be heated in two steps. In the first step, the mixture of disulfide and silver difluoride is heated for ½ to 24 hours in a suitable solvent at a temperature which is generally below 100° C., preferably 40–75° C. The solvent is then removed and the reaction mixture, which contains principally the nitroarylsulfur trifluoride at this stage, is heated for an additional substantially equivalent period to 115–150° C. The reaction product is then purified by conventional procedures, for example, by distillation, by crystallization, or by chromatography.

Silver difluoride is preferably used in excess (e.g., to about 5:1 and 30:1 on a molar basis), although the proportions in which the reactants are used are not critical. Solvents include fully halogenated hydrocarbons in which the halogens are chlorine or fluorine and which boil above 30° C. and below 100° C.

Optionally the mixture of nitroaryl disulfide and silver difluoride can be heated in the absence of a solvent in one step to 115° C. or higher, but lower yields generally result.

The disulfides employed are obtained by conventional procedures described in the literature. The nitro group can be bonded to any carbon in the aromatic ring, except, of course, the carbon bonded to the sulfur of the disulfide group.

The nitroarylsulfur pentafluorides can be prepared by nitrating an arylsulfur pentafluoride by well-known procedures, for example, by using nitric acid-sulfuric acid mixtures. The arylsulfur pentafluoride which is used as a reactant in this procedure is obtained by the action of silver difluoride on a diaryl disulfide at a temperature of at least 115° C. Reduction of the nitroarylsulfur pentafluorides to aminoarylsulfur pentafluorides is effected by well-known and established procedures, particularly under hydrogen pressure in the presence of a broad range of catalysts such as nickel, tin, platinum, titania, palladium, sodium, and ammonium polysulfides and sodium and ammonium thiosulfates.

The new compounds of this invention are biologically active, particularly as growth regulators. Thus, at a concentration of the order of 5 to 50 p.p.m., the pentafluorosulfidoarylhydrazones of carbonyl cyanide caused marked retardation of the rate of growth of young squash seedlings. The roots of the plants were short as compared to controls. As shown previously, such treated plants had increased resistance to freezing.

When the roots of other plants such as wiregrass and marigold are treated with a concentration of this compound of the order of 100 p.p.m. or higher, the plants are killed.

Use of the compounds as foliar spray (in aqueous sodium carbonate solution) of 1000 p.p.m. concentration retarded the growth of xanthium and lettuce plants.

The compounds of this invention are unusually effective as uncouplers for biological oxidative phosphorylation. In this well-recognized test the compounds are much more effective than 2,4-dinitrophenol, which is accepted at a highly effective uncoupler of oxidative phosphorylation. Thus, for isolated tomato root mitochondria, m- and p-pentafluorosulfido-phenylhydrazone of carbonyl cyanide at a concentration of $1.3 \times 10^{-7}$ and $3 \times 10^{-7}$ mole per liter effected 50% uncoupling; whereas, 2,4-dinitrophenol required a concentration of $1.6 \times 10^{-5}$ mole per liter (i.e., about 100 times as much) to produce the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A compound of the tautomeric formulae $(F_5S)_n—Ar—NH—N=C(CN)_2$ and $(F_5S)_n—Ar—N=N—CH(CN)_2$ wherein $n$ is an integer from 1 to 2 and Ar is a member of the class consisting of aromatic hydrocarbon groups of 6–18 carbon atoms and halogenated aromatic hydrocarbon groups of 6–18 carbon atoms wherein the halogen thereof is a member of the class consisting of fluorine, chlorine and bromine.

2. A compound of the tautomeric formulae $(F_5S)_n—Ar—NH—N=C(CN)_2$ and $(F_5S)_n—Ar—N=N—CH(CN)_2$ wherein $n$ is an integer from 1 to 2 and Ar is an aromatic hydrocarbon group of 6–18 carbon atoms.

3. A compound of the tautomeric formulae $(F_5S)_n—Ar—NH—N=C(CN)_2$ and $(F_5S)_n—Ar—N=N—CH(CN)_2$ wherein $n$ is an integer from 1 to 2 and Ar is a chlorinated aromatic hydrocarbon group of 6–18 carbon atoms.

4. A compound having the tautomeric formulae

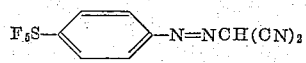

and

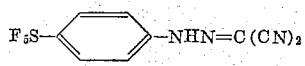

5. A compound having the tautomeric formulae

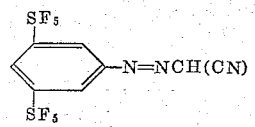

and

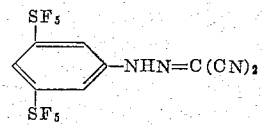

References Cited in the file of this patent
UNITED STATES PATENTS

| | | | |
|---|---|---|---|
| 2,658,889 | Goldberg et al. | Nov. 10, | 1953 |
| 2,697,726 | Silvey et al. | Dec. 21, | 1954 |
| 2,758,050 | Hackmann | Aug. 7, | 1956 |
| 2,792,296 | Heininger | May 14, | 1957 |

UNITED STATES PATENT OFFICE
CERTIFICATE OF CORRECTION

Patent No. 3,135,736                           June 2, 1964

William W. Prichard

It is hereby certified that error appears in the above numbered patent requiring correction and that the said Letters Patent should read as corrected below.

Column 2, lines 32 to 37, the lower right-hand portion of the formula reading "-NHH=C(CN)$_2$" read -- -NHN=C(CN)$_2$ --; column 8, lines 32 to 36, for the right-hand portion of the formula reading "-N=NCH(CN)" read -- -N=NCH(CN)$_2$ --.

Signed and sealed this 29th day of September 1964.

(SEAL)
Attest:

ERNEST W. SWIDER                          EDWARD J. BRENNER
Attesting Officer                             Commissioner of Patents